United States Patent [19]

Akkerman

[11] Patent Number: 4,632,406
[45] Date of Patent: Dec. 30, 1986

[54] APPARATUS IN WHICH AN ANNULAR RING IS CARRIED WITHIN A GROOVE ABOUT ONE MEMBER FOR SLIDABLY ENGAGING THE CYLINDRICAL SURFACE OF ANOTHER MEMBER

[75] Inventor: Neil H. Akkerman, Kingwood, Tex.

[73] Assignee: AVAA International Corp., Houston, Tex.

[21] Appl. No.: 415,391

[22] Filed: Sep. 7, 1982

Related U.S. Application Data

[63] Continuation-in-part of Ser. No. 225,395, Jan. 15, 1981, Pat. No. 4,477,104.

[51] Int. Cl.⁴ .............................................. F16J 15/06
[52] U.S. Cl. .................................. 277/188 A; 277/30; 277/165; 277/166; 277/206 R
[58] Field of Search ............ 277/30, 165, 166, 188 A, 277/206 R; 308/3 R; 285/18, 94, 319; 166/124, 125

[56] References Cited

U.S. PATENT DOCUMENTS

| | | | |
|---|---|---|---|
| 1,612,039 | 12/1926 | Miller | 277/188 A X |
| 2,366,161 | 1/1945 | Tweedale | 277/206 R |
| 2,548,412 | 4/1951 | Walker | 277/206 X |
| 2,751,235 | 6/1956 | Watts et al. | 277/206 X |
| 3,132,869 | 5/1964 | Campbell | 277/188 A X |
| 3,349,418 | 10/1967 | Hein | 308/3 R X |
| 3,473,814 | 10/1969 | Bastow | 277/188 A |
| 3,612,538 | 10/1971 | Sievenpiper | 277/165 |
| 3,834,744 | 9/1974 | Masatchi | 277/206 R X |
| 4,218,933 | 8/1980 | Allen et al. | 308/3 R X |
| 4,238,138 | 12/1980 | Demorieux | 308/3 R |

FOREIGN PATENT DOCUMENTS

| | | | |
|---|---|---|---|
| 249400 | 2/1964 | Australia | 277/165 |
| 527363 | 10/1940 | United Kingdom | 277/206 |
| 813780 | 5/1959 | United Kingdom | 277/166 |
| 2105014 | 3/1983 | United Kingdom | 384/34 |
| 368444 | 5/1973 | U.S.S.R. | 277/206 |

*Primary Examiner*—Robert S. Ward
*Attorney, Agent, or Firm*—Vaden, Eickenroht, Thompson & Boulware

[57] ABSTRACT

An apparatus in which an annular ring is carried within a groove about one member for slidably engaging the cylindrical surface of another member. In certain of the embodiments, the ring is a seal ring to form a sealed joint, and, in another embodiment, the ring is a bearing ring to form a bearing assembly. In each case, a recess is formed in the side of the ring intermediate lips or annular surfaces thereof which slidably engage the cylindrical surface, and a metal ring is moved into a position opposite the recess and radially distorted into the recess to retain the seal or bearing ring within the groove.

52 Claims, 12 Drawing Figures

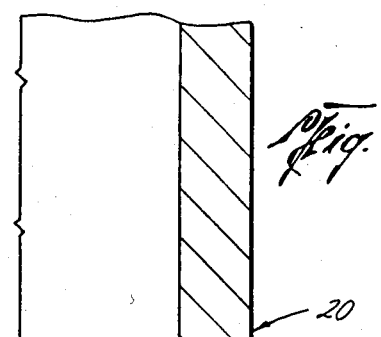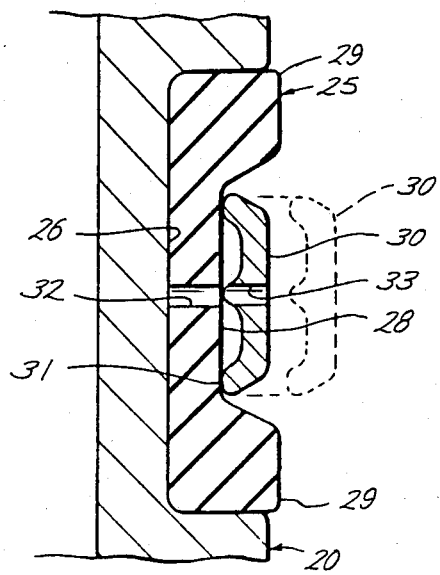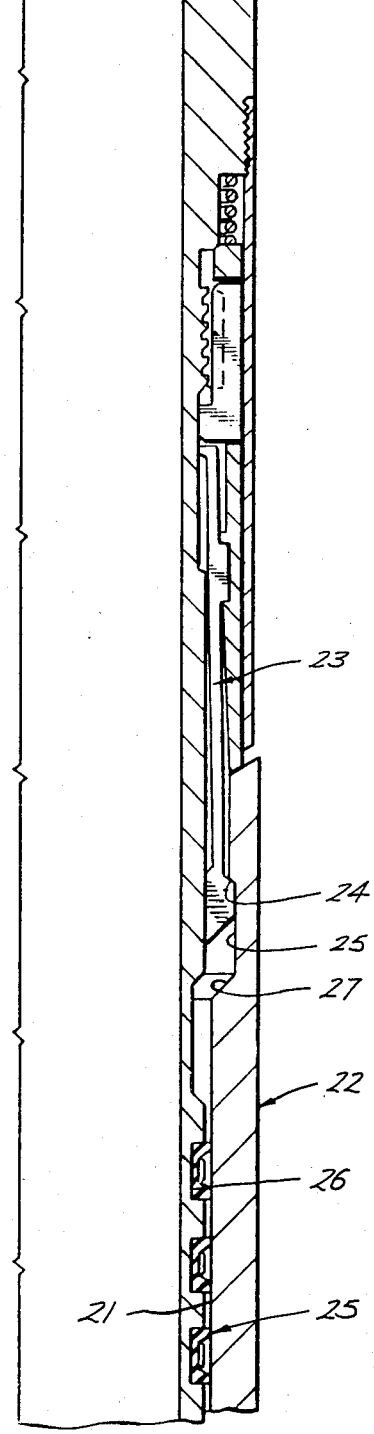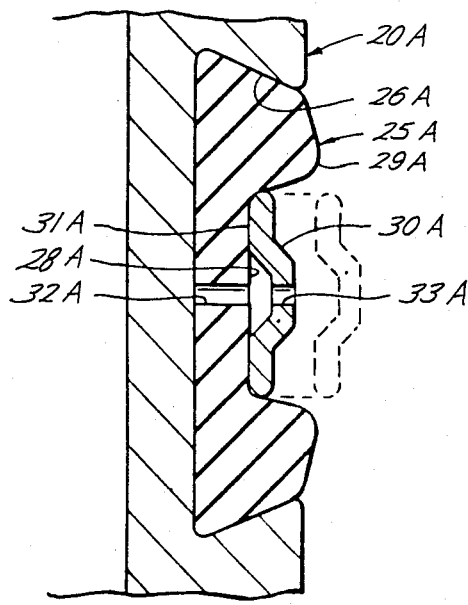

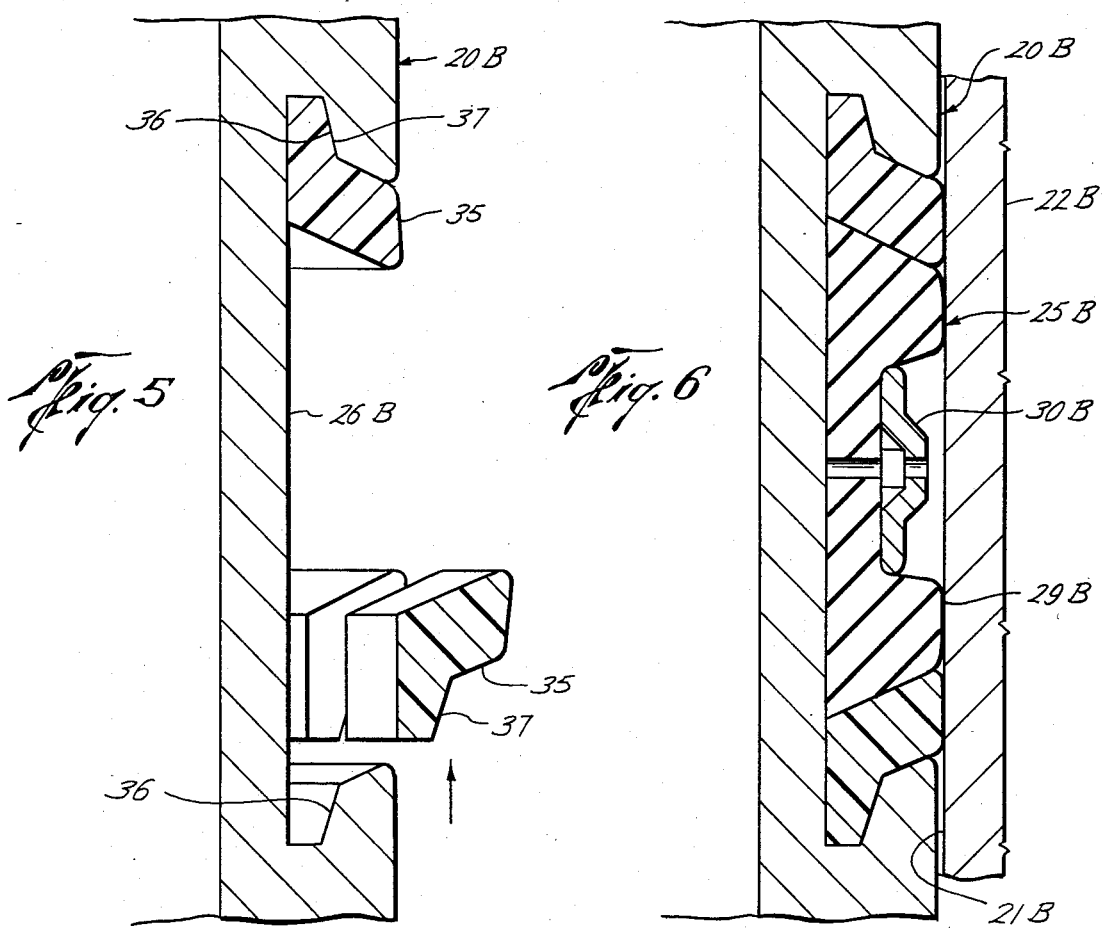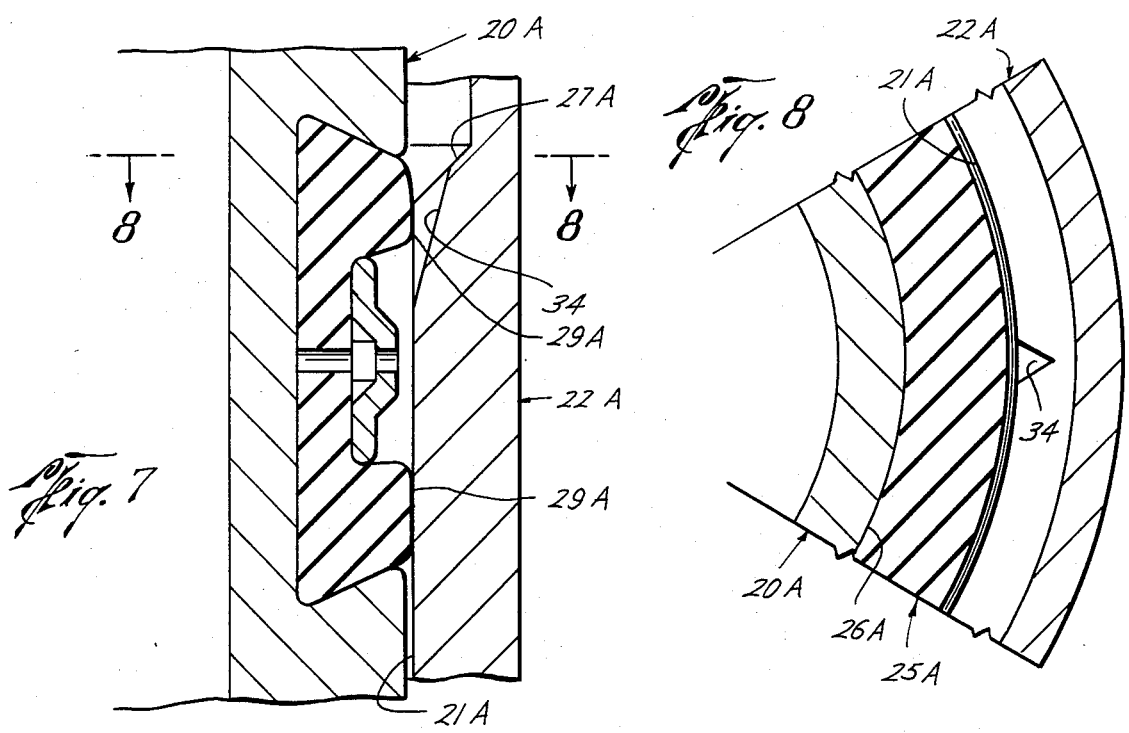

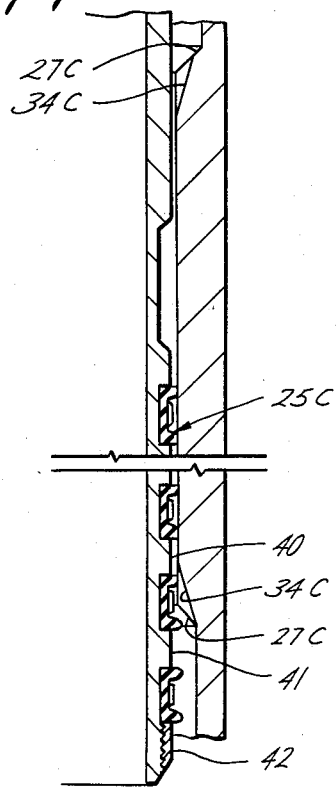
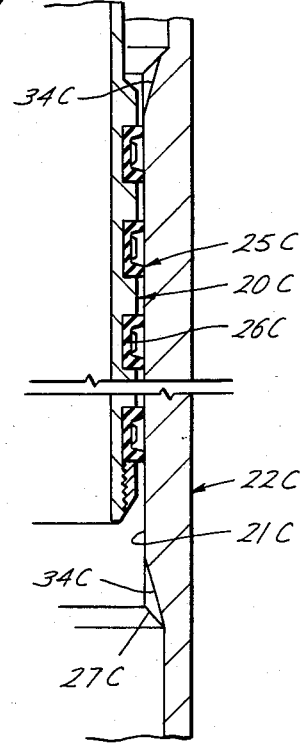
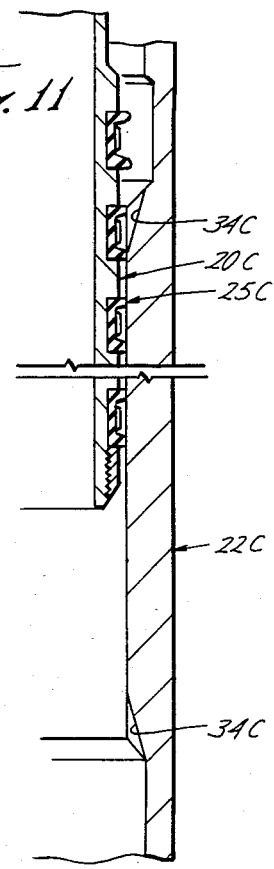
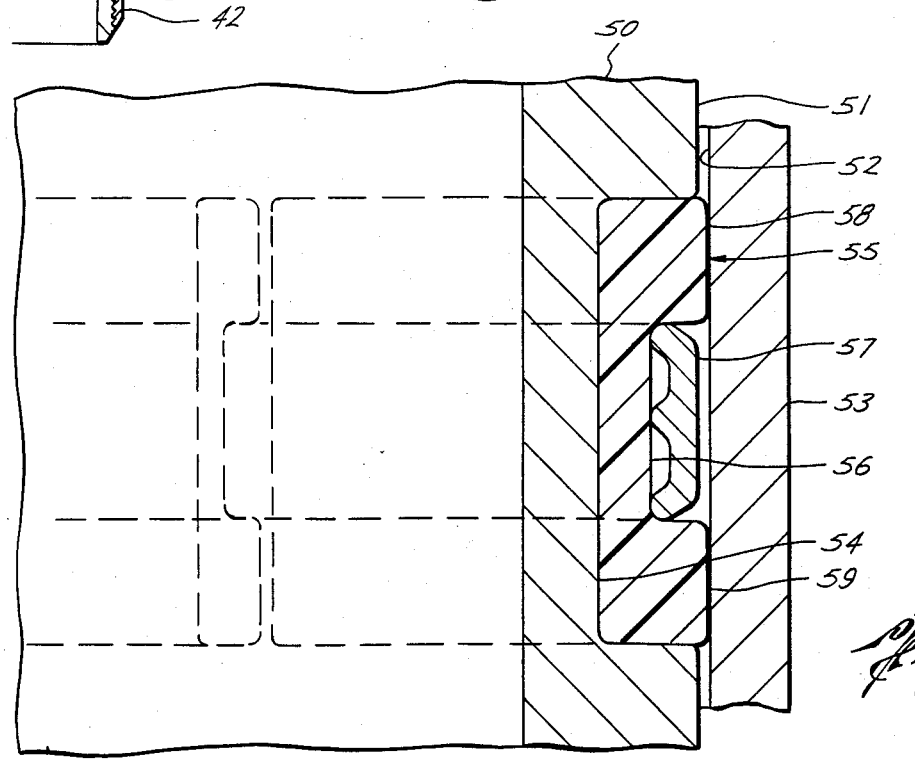

APPARATUS IN WHICH AN ANNULAR RING IS CARRIED WITHIN A GROOVE ABOUT ONE MEMBER FOR SLIDABLY ENGAGING THE CYLINDRICAL SURFACE OF ANOTHER MEMBER

This application is a continuation-in-part of my co-pending application, Ser. No. 225,395, filed Jan. 15, 1981, and entitled "Releasable Latching Apparatus," now U.S. Pat. No. 4,477,104.

This invention relates generally to improved apparatus of the type in which an annular ring is carried within and protrudes from an annular groove about a first member for slidably engaging the cylindrical surface of a second member when such members are moved telescopically of one another. In one aspect of the invention, the ring is a seal ring of elastic material to form a sealed joint with the cylindrical surface, and in another of its aspects, the ring is a ring of bearing material to form a bearing assembly with the cylindrical surface.

In prior sealed joints of this type, considerable effort and expense has been required both to assemble and then retain the seal ring within the groove of the first member. This is especially true when, for example, one or both members comprises an oil tool adapted to be reciprocated within an oil or gas well conduit, such as may occur in the installation and removal of the lower end of a tubing string carrying seal rings thereabout for sliding within a cylindrical surface of the upper end of an upstanding well conduit. In this event, fluid pressures between adjacent seal rings of a succession of seal rings, or between adjacent sealing lips of each seal ring, or both, and these pressure differentials across the rings and/or lips, may cause conventional seal rings to be damaged, or, in some cases, actually pulled out of the grooves. As a consequence, it may be found necessary to bond the seal ring to a support ring within the groove or to the groove itself.

It is also standard practice to assemble a seal ring, or a bearing ring for that matter, over the reduced diameter end of one member, and then retain it in place by means of a gland nut threadedly secured to the reduced diameter end. There may of course be a series of such rings separated by spacers received over the end of the one member. In addition to the fact that this requires the fabrication of a gland nut, the one member must still be sealed with respect to one another, thereby adding to the expense of the apparatus as well as the possibility of its failing during use.

The primary object of this invention is to provide apparatus of this type in which each ring, whether it be a seal ring or a bearing ring, or a combination of them, is assembled and securely retained without bonding within a groove or without the fabrication and assembly of threadedly connected gland nuts or other retainer parts.

Another object is to provide a sealed joint of the character above described in which the seal ring is prevented from extrusion between the members of the joints by means which is easily assembled and retained within the groove.

A further object is to provide a sealed joint of this type which is of such construction as to provide the seal rings from being blown out or damaged, as the members move into and out of telecoping relation, despite pressure differentials thereacross.

These and other objects are accomplished, in accordance with the illustrated embodiments of the invention, by apparatus of the type described, wherein the ring, which may be a seal ring in the case of a sealed joint, or a bearing ring in the case of a bearing joint, has a recess in its side adjacent at least one annular surface thereof which, when the ring is assembled within the groove of the first member, protrudes therefrom for sliding engagement with respect to the cylindrical surface of the second member. More particularly, the ring is retained within the groove in the first member by means of another ring which has a circumferential shape permitting it to be moved axially of the first member and into a position opposite the recess, and which is of a material which is radially distortible to permit it to be moved into the recess, but relatively non-elastic so that, when so distorted, it will retain the ring within the groove.

In the illustrated embodiments of the invention, the recess is intermediate protruding annular surfaces on the ring, e.g., lips in the case of the sealed joints, and the groove is on the outer side of the first member for disposal telescopically within the cylindrical surface on the inner side of the second member. In those embodiments of the invention wherein the apparatus is a sealed joint, the seal ring is of an elastic material adapted to be stretched over the end of the one member in which the groove is formed, while in the embodiment of the invention wherein the apparatus is instead a bearing assembly, the bearing ring is of relatively non-elastic bearing material which is circumferentially split to permit the split ends to be spread in order to move the bearing ring over the end of the one member.

In the preferred and illustrated embodiments of the sealed joint, the second member has a guide surface at one end of its cylindrical surface, whereby the axially spaced lips of the seal ring and/or lips of adjacent ends of successive seal rings are successively compressed or decompressed as the members are moved relatively into and out of telescoping relation. More particularly, a vent means is formed in the second member for substantially equalizing pressure across each lip prior to its compression as the members are moved into telescoping relation and decompression as the members are moved out of telescoping relation. Consequently, the seal rings are not damaged as high pressure trapped between successive rings is "unloaded" during movement of the members out of telescoping relation. Also, the space between lips is not pressurized as the members are moved into telescoping relation. Preferably, the vent means comprises a groove which is formed in the cylindrical surface of the second member to connect the guide surface with the cylindrical surface a distance from the intersection of the guide and cylindrical surfaces at least as great as the compressed width of each lip. In one illustrated body of the invention, a guide surface and vent groove are provided at opposite ends of a cylindrical surface of a second member in order to accomplish the desired function regardless of the relative directions of movement of the members as they are moved into or out of telescoping relation.

In one embodiment of the invention, the groove in the one member of the sealed joint is of a dovetail shape in cross section, and the seal ring is of matching cross-sectional shape for fitting closely therein, thereby resisting movement of the seal ring out of the groove. In another embodiment of the invention, a circumferentially split anti-extrusion ring is disposable between each end of the groove and one end of the seal ring, with the ends of the groove being undercut and flanges on the ends of the anti-extrusion rings being urged by the seal ring into closely fitting relation with the undercuts. More particularly, the anti-extrusion rings are of a material which is substantially non-elastic but nevertheless sufficiently deformable due to axial expansion of the seal ring to permit their outer surfaces to be move radially into positions close to the cylindrical surface of the second member.

In the drawings, wherein like reference characters are used throughout to designate like parts:

FIG. 2 is a cross-sectional view of one side of the lower end of the tubing string, when so lowered into the bore of the well conduit and upon movement of a latching assembly carried by the tubing string into latching engagement with a groove in the well conduit above the cylindrical surface with which the seal rings are sealably engaged:

FIG. 3 is an enlarged, vertical sectional view of a portion of the string and showing one of the seal rings retained within a groove thereabout by means of a metal ring which is shown in broken lines in the position it occupies as it is moved axially into a position opposite the recess in the seal ring:

FIG. 4 is a vertical sectional view similar to FIG. 3, but having a seal ring retained within the groove in accordance with an alternative embodiment of the invention:

FIG. 5 is a vertical sectional view of a tubing string or other tubular member having a groove thereabout in which a seal ring similar to that of FIG. 4, is assembled and retained, and showing anti-extrusion rings at both ends thereof, the upper of the extrusion rings being shown moved into a dovetail in the upper end of the groove and the lower extrusion ring being shown in a position opposite the groove:

FIG. 6 is a view similar to FIG. 5, with both extrusion rings in place within the upper and lower dovetails of the groove, and the seal ring disposed therein between the anti-extrusion rings and retained by a metal ring in a manner similar to that of FIG. 4;

FIG. 7 is an enlarged vertical sectional view of a sealed joint of FIG. 4 as it is lowered into telescoping relation within the cylindrical surface of the outer member of the joint, and wherein the lower of the two lips of the seal ring has been compressed inwardly by a guide surface on the outer member while the space between both lips is vented to the annular space between the members above the compressed lip:

FIG. 8 is a partial cross-sectional view of the sealed joint of FIG. 7, as seen along broken lines 8—8 thereof:

FIGS. 9, 10 and 11 are vertical sectional views of a sealed joint including the lower end of a string having a plurality of seal rings assembled and retained within vertically spaced-apart grooves thereabout, in a manner shown in FIG. 2, for sealably engaging a cylindrical surface of the outer tubular member having guide surfaces on both the upper and lower ends, FIG. 9 showing the lower seal rings out of sealing engagement with the cylindrical surface of the outer member, FIG. 10 showing all of the seal rings in sealing engagement with the cylindrical surface, and FIG. 11 showing the upper seal rings out of sealing engagement therewith; and FIG. 12 is an enlarged vertical sectional view of part of a bearing assembly constructed in accordance with the present invention, wherein upper and lower bearing surfaces of the bearing ring protrude for slidable engagement with the inner diameter of the outer tubular member within which the inner tubular member is telescopically disposed.

Figure 1:
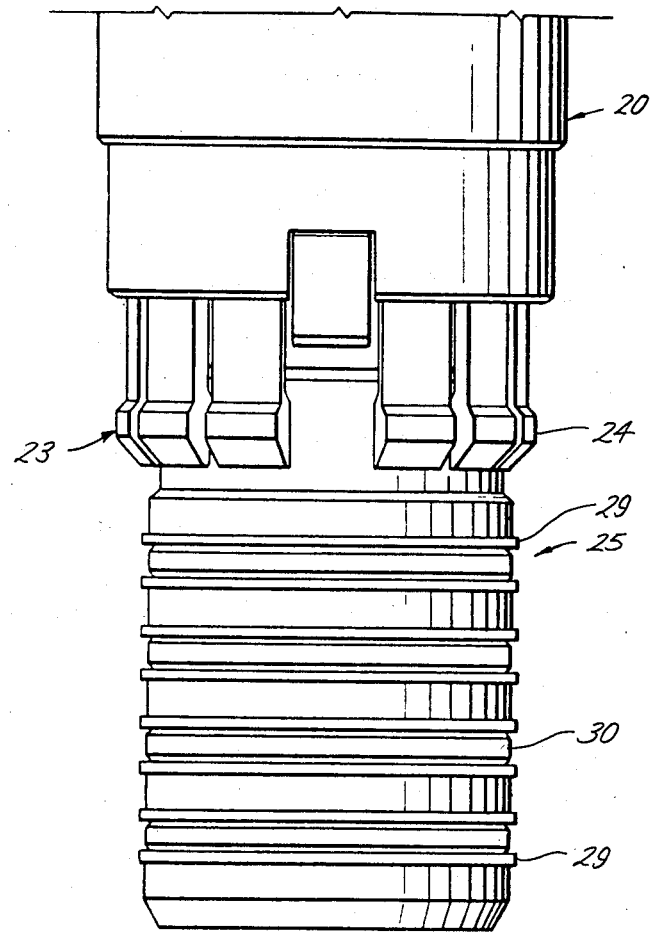
FIG. 1 is an elevational view of well equipment including the lower end of a tubing string as it is lowered into the bore of the upper end of a well conduit, with seal rings being assembled and retained about the lower end of the tubing string in accordance with one embodiment of the present invention so as to sealably engage with a cylindrical surface of the bore when so lowered.
Figure 1:
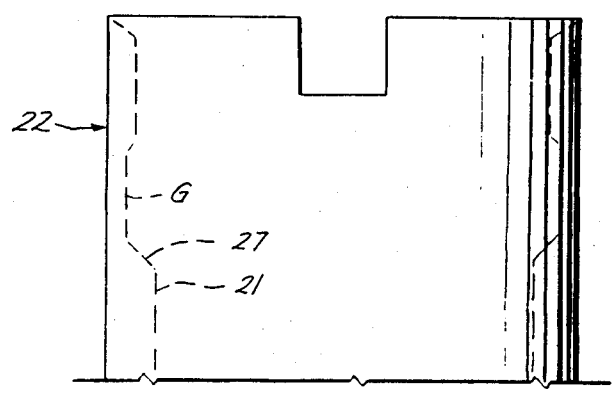

As shown in FIGS. 1 and 2, and as described in detail in the aforementioned copending patent application, the lower end of a tubing string 20 is adapted to be lowered into the bore within the upper end of a well conduit 22, and, when so lowered, to be latched in landed position within the well conduit by means of a latch assembly 23 carried by the string. The latch assembly includes a plurality of latching dogs 24 which are adapted to be moved into and held within a latching groove G near the upper edge of the bore of the well conduit. The detailed construction and operation of the latching assembly is unimportant to the present invention and merely illustrates a portion of a typical environment for the sealed joint of the present invention.

A plurality of seal rings 25 are assembled and retained within vertically spaced-apart annular grooves 26 formed in the lower cylindrical surface of the tubing string for sealably engaging a cylindrical surface 21 of the bore within the well conduit beneath latching groove G. As previously mentioned, and for a purpose to be described in detail to follow, a conical guide surface 27 is formed on the upper end of the cylindrical surface 21 to form an enlarged annular space through which the lower ends of the latches 24 are adapted to move into and out of the latching position shown in FIG. 2.

As best shown in FIG. 3, each of the seal rings 25, which is formed of rubber or other suitable elastic sealing material, is closely received within its groove 26 and has an annular recess 28 about its outer side intermediate annular lips 29. As shown, the lips protrude from the grooves so as to be compressed into tight sealing engagement with the surface 21 of the well conduit as the lower end of the tubing string is lowered into telescoping relation within the well conduit.

Each seal ring is assembled within its groove by stretching it to permit it to move over the lower end of tubing string 20, and then snap into place when disposed opposite the groove 26. The seal ring 25 is retained within the groove by means of a ring 30 which is of such width from its upper to its lower end as to fit within the recess from its upper to its lower end. The ring is made of a metal which is distortible from an initial circumferential shape which, as shown in broken lines in FIG. 3, permits it to be moved axially over the lower end of the tubing string, and thus into a position laterally opposite the recess, and then radially inwardly the recess as shown in solid lines in FIG. 3. More particularly, the ring 30 is relatively non-elastic so that when so distorted, it will retain the seal ring within the groove. The selection of a suitable metal for this purpose, as will be suitable tools for radially distorting the retainer ring, will be obvious to a person skilled in the art.

Preferably, ribs 31 are formed on the inner side of the retainer ring in order to exert a clamping force along small areas at the upper and lower ends and intermediate portion of the recess. The space between the ribs on the inner side of the retainer ring permit the seal ring to swell, and the ring is of such thickness that, when clamped within the recess, its outer diameter does not project from the outer cylindrical surface of the tubing string, and thus does not interfere with the free movement of its lower end into a position within the bore 21 of the well conduit.

The seal ring 25 is permitted to breathe, in the event fluid accumulates behind its inner side, by means of one or more holes 32 formed therein to connect its inner side with the space between the inner side of the retainer ring and the bottom of the recess 26, and the ring 30 has one or more holes 33 formed in it to connect this space with its outer side.

The embodiment of the sealed joint which is illustrated in FIG. 4 is similar to that above described, and thus includes a seal ring 25A which is assembled within a groove 26A about a tubing string or other tubular member 20A. However, this seal ring differs in cross section from seal ring 25 in order to fit closely within a dovetailed groove 26A in the tubular member and these assist in holding the seal ring within the groove. Also, the lips 29A about the upper and lower ends of the seal ring for sealing with a cylindrical surface of an outer tubular member, such as the bore of a well conduit, have surfaces which converge in a radially outward direction. Thus, the upper lip is intended to seal against a predominant pressure acting in an upward direction, and the lower lip is intended to seal against a predominant pressure acting in a downward direction. This is of advantage, for example, as the lower end of the tubular member is lifted from telescoping relation within the bore of the outer tubular member because it permits a predominant pressure trapped between the lips and acting in an upward direction to be "unloaded" as soon as the upper lip moves past the upper edge of the cylindrical surface.

The retainer ring 30A of the joint of FIG. 4 functions in generally the same manner as the ring 30 of the embodiment of FIG. 3. That is, it is radially distortible from an initial shape (broken lines), which permits it to be moved axially over the end of the tubular member 20A into a position opposite the recess 28A, into the shape shown in solid lines in which it is within the recess in the seal ring 25A so as to retain it within the groove of the tubular member.

Also, as in the case of the first-mentioned embodiment, the inner diameter of the ring 30A has ribs 31A formed thereon which engage the recess in the seal ring near its upper and lower ends. Also, one or more holes 32A are formed in the seal ring to connect its inner side with the space between the inner side of the retainer ring and the bottom of the recess 28A, and the retainer ring has one or more holes 33A formed in it to connect the space with its outer side.

The sealed joint illustrated in FIGS. 7 and 8 is identical to that described above in that it includes an inner tubular member 20A having a seal ring 25A retained within a groove 26A therein in the manner shown in connection with FIG. 4. In this embodiment, however, a groove or slot 34 is formed in the cylindrical surface 21A of the outer tubular member 22A to connect at its upper end with the conical guide surface 27A and at its lower end with the cylindrical surface at a distance from the intersection of the cylindrical and guide surfaces which is greater than the compressed width of each of the lips 29A of the seal ring. Thus, upon lowering of inner tubular member 20A to the position shown in FIG. 7 wherein both the lower and upper lips of the seal ring 25A have been moved into the cylindrical surface 21A, the space between the lips and within the recess in the seal ring remains vented to the annular space between the tubular members above the guide surface 27A. Consequently, although the volume of the recess is gradually decreased as the second or upper lip of the seal ring is compressed by movement into the cylindrical surface 21A, fluid trapped within the recess does not act to extrude the upper lips since pressure across it is equalized.

As previously described, the embodiment of the seal assembly illustrated in FIGS. 5 an 6 differs from those previously described, and in particular the embodiments illustrated in FIGS. 4, 7 and 8, in that anti-extrusion rings 35 are received within the upper and lower ends of a groove 26B in the inner tubular member 20B to prevent the sealing lips 29B of a seal ring 25B assembled within the groove intermediate into the and rings 35 from extruding between the members. Thus, as shown, the groove is provided with dovetail slots 36 in its upper and lower ends to receive similarly shaped flanges 37 on the upper and lower ends of the upper and lower anti-extrusion rings, respectively. When the seal ring is fitted between the anti-extrusion rings, its upper and lower ends will urge them into the dovetail slots. The seal ring 25B which is preferably of the shape shown in FIG. 4, is retained within the groove by means of a ring 30B, which is of construction and adapted to be manipulated in a manner to be described in connection with FIG. 4.

Each of the anti-extrusion rings is of a material, such as glass-filled nylon or the like, which although substantially non-elastic, is nevertheless sufficiently deformable that upon compression of the lips of the seal into sealing engagement with cylindrical surface 21B, as shown in FIG. 6, the outer surfaces of the anti-extrusion rings are deformed radially outwardly to move close to the inner and outer tubular members, and thus prevent extrusion of the lips into a gap between the outer surface 20B of the inner member 22B and cylindrical surface 21B of the outer tubular member 20B. The material of the anti-extrusion rings is, however, also relatively smooth and has a low friction coefficient so that it will not interfere with vertical movement of the inner tubular member while the seal rings 25B are sealably engaged with the outer tubular member.

As illustrated in FIG. 5, each anti-extrusion ring is circumferentially split so as to permit it to be moved axially over the end of the inner tubular member and into a position opposite the groove 26B, and then moved radially inwardly into the groove and axially upwardly or downwardly into the dovetail in either the upper or lower end of the slot. For this purpose, the retainer ring may comprise two or more circumferentially split parts, or a single "C" shaped part split at one location about its circumference.

In the embodiment of the invention illustrated in FIGS. 9 to 11, a plurality of seal rings 25C are carried within vertically spaced grooves 26C about an inner tubular member 20C, such as the lower end of a tubing string, which is adapted to be moved into telescoping relation within a cylindrical surface 21C of an outer tubular member 22C such as the bore of a wellhead conduit. As shown, each of the seal rings 25C is of the type shown and described in connection with FIG. 3, and thus is assembled and retained within a groove thereabout from which its lips protrude for sealably engaging the cylindrical surface 21C. As shown in FIG. 10, there are guide surfaces 27C at both ends of the cylindrical surface which is of such length as to receive all the seal rings in an intermediate telescopic position of the inner member. Thus, upon raising the inner member, as shown in FIG. 11, upper seal rings are successively pulled out of sealing engagement with the surface, and upon lowering thereof, as shown in FIG. 9, lower seal rings are successively pushed out of sealing engagement therewith.

Although this portion of the seal assembly of FIGS. 9 to 11 is of conventional construction, grooves or slots 34C are formed in the cylindrical bore 21C of the outer tubular member 22C so as to connect at one end with the conical guide surface 27C at either the upper or lower end of the cylindrical surface 21C. More particularly, the grooves 34C are of an axial extent along the inner cylindrical surface 21C which is greater than the compressed width of each lip of each of the seal rings 25C during movement of the inner tubular member axially with respect to the outer tubular member between the various positions shown in FIGS. 9, 10 and 11. Thus, the lips are maintained in compressed condition against the cylindrical surface 21C of the outer tubular member as pressure within the annular space between adjacent seal rings is unloaded. Consequently, although large pressures may build up between successive seal rings, the differential between those pressures and the pressure within the annular space above or below will not cause the emerging seal ring lip to be blown out of its groove.

The bearing assembly illustrated in FIG. 12 includes, as in the case of the above-described sealed joints, an inner tubular member 50 having an outer cylindrical surface 51 adapted to be disposed closely within the cylindrical bore 52 of an outer tubular member 53. More particularly, the outer cylindrical surface 51 has at least one groove 54 formed thereabout to closely receive a bearing ring 55, which, as in the case of the seal rings of the above-described sealed joints, has a recess 56 about its outer side, and is retained within the groove by means of a metal ring 57 disposed within the recess. When the bearing ring is so retained, outer cylindrical surfaces 58 and 59 thereof above and below the recess 56 protrude from the outer cylindrical surface 51 of the inner tubular member 50 so as to be slidably engagable with the cylindrical surface 52.

The retainer ring 57 is of a construction similar to that best shown and described in FIG. 3 in that it is adapted to be moved axially over the end of inner tubular member 50 into a position opposite the recess 56 and then distorted radially inwardly into the clamping position shown in FIG. 12, wherein its outer diameter is spaced inwardly of the bearing surfaces 58 and 59, and thus out of interfering relation with the inner cylindrical surface 52. It also has upper, lower and intermediate ribs on its inner diameter for pressing against the recess 56 in the bearing ring 55 when distorted radically in the recess.

The bearing ring is of any suitable bearing material, such as Teflon, which, as compared with the seal rings of the previously described sealed joints, is of a relatively hard, non-elastic material having a low coefficient of friction. Consequently, in order to be assembled within the recess 54, the bearing ring is circumferentially split so as to permit it to be moved over the end of the inner tubular member and then inwardly into the groove when disposed opposite thereto. For this purpose, and as illustrated in FIG. 12, the bearing ring may be formed in two or more circumferentially separated parts. Obviously, in a bearing assembly of this type, there may be two or more vertically spaced-apart bearing rings 55 carried about the inner tubular member 50.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus comprising first and second members adapted to be telescopically disposed with respect to one another, said first member having a circumferential groove thereabout which is opposite a cylindrical surface of the second member when said members are telescopically disposed, a first ring assembled within the groove and having a recess in its side adjacent at least one annular surface thereof which protrudes from the groove for sliding engagement axially with respect to the cylindrical surface of the second member, and a second ring having a circumferential shape which permits it to be moved axially of the first member and into a position opposite the recess in the first ring, said second ring being of a material which is radially distortible into the recess but relatively non-elastic so that, when so distorted, it will retain said first ring within said groove.

2. Apparatus of the character defined in claim 1, wherein the recess is intermediate protruding annular surfaces on the side of the first ring.

3. Apparatus of the character defined in claim 1, wherein the groove is in the outer side of the first member for disposal telescopically within the cylindrical surface on the inner side of the second member, and said retainer ring is movable axially over the end of the first member and then distorted radially inwardly against the recess in the first ring.

4. A sealed joint, comprising first and second members adapted to be telescopically disposed with respect to one another, said first member having a circumferential groove thereabout which is opposite a cylindrical surface of the second member when said members are telescopically disposed, a circumferentially continuous seal ring of elastic material adapted to be distorted into a shape which permits it to be moved axially of the first member and into the groove therein, said seal ring having a recess in its side adjacent at least one annular lip thereof which protrudes from the groove of the first member for sealing engagement with the cylindrical surface of the second member, and another ring having a circumferential shape which permits it to be moved axially of the first member and into a position opposite the recess in the seal ring, said other ring being of a material which is radially distortible into the recess, but relatively nonelastic so that, when so distorted, it will retain said seal ring on said first member.

5. A sealed joint of the character defined in claim 4, wherein the recess is intermediate protruding annular lips on the side of the seal ring.

6. A sealed joint of the character defined in claim 5, wherein the second member has a guide surface at one end of its cylindrical surface, whereby the lips of the seal ring are successively compressed or decompressed as the members are moved relatively into or out of telescoping relation, said cylindrical surface having vent means formed therein for substantially equalizing pressure across each lip prior to compression as the members are moved into telescoping relation and decompression as they are moved out of telescoping relation.

7. A sealed joint of the character defined in claim 6, wherein the vent means comprises a groove formed in the cylindrical surface of the second member to connect its guide surface with its cylindrical surface a distance from the intersection of said surfaces at least as great as the compressed width of each seal lip.

8. A joint of the character defined in claim 4, wherein the groove is in the outer side of the first member for disposal telescopically within the cylindrical surface on the inner side of the second member, the seal ring is adapted to be stretched over the end of said first member, and the retainer ring is movable axially over the end of the first member and then distorted radially inwardly against the recess in the seal ring.

9. A joint of the character defined in claim 4, wherein the groove is of dovetail shape in cross section, and the seal ring is of matching cross-sectional shape for fitting closely therein.

10. A joint of the character defined in claim 4, including a pair of anti-extrusion rings each of which is circumferentially split to permit it to be disposed between each end of the groove and one end of the seal ring, the ends of the groove being undercut and the ends of the anti-extrusion rings being urged by the seal ring into closely fitting relation within the undercut ends, and the anti-extrusion rings being of a material which is substantially non-elastic but nevertheless sufficiently deformable that their outer surfaces are expanded into positions close to the cylindrical surface of said second member in response to axial expansion of the seal ring.

11. A joint of the character defined in claim 10, wherein the opposite ends of the anti-extrusion rings are undercut and the adjacent ends of the seal ring fit closely thereagainst.

12. A joint of the character defined in claim 5, wherein the outer surfaces of the lips taper convergently toward one another.

13. A joint of the character defined in claim 5, wherein the retainer ring has axially spaced, annular ribs thereabout for pressing tightly against the recess in the seal ring adjacent its corners.

14. A joint of the character defined in claim 5, wherein the seal ring has a hole therein connecting its inner side adjacent the recess with a space on the inner side of the retainer ring intermediate the ribs, and the retainer ring has a hole therein connecting the space with the outer side of the clamp ring.

15. A sealed joint, comprising first and second members adapted to be telescopically disposed with respect to one another, seal means of elastic material carried by the first member for disposal opposite a cylindrical surface of the second member when said members are telescopically disposed, said seal means including axially spaced annular sealing portions which protrude for sealing engagement with the cylindrical surface of the second member, the second member having a guide surface at one end of its cylindrical surface, whereby the protruding sealing portions are successively compressed or decompressed as said members are moved relatively into or out of telescoping relation, and vent means formed in the second member for substantially equalizing pressure across each sealing portion prior to compression as the members are moved into telescoping relation and decompression as the members are moved out of telescoping relation.

16. A sealed joint of the character defined in claim 15, wherein the vent means comprises a groove formed in the cylindrical surface of the second member to connect the guide surfaces with the cylindrical surface a distance from the intersection of the guide surface and cylindrical surfaces at least as great as the compressed width of each protruding sealing portion.

17. A sealed joint of the character defined in claim 15, wherein said seal means comprises a seal ring received within a groove about the first member, and said sealing portions comprise sealing lips of the seal ring.

18. A sealed joint of the character defined in claim 15, wherein said seal means comprises a plurality of seal rings received within axially spaced-apart grooves about the first member.

19. A sealed joint of the character defined in claim 15, wherein a second guide surface is formed at the opposite end of the cylindrical surface of the second member, and additional vent means is provided in the second member for substantially equalizing pressure across each sealing portion prior to compression by the second guide surface as the members are moved into and decompression with respect thereto as the members are moved out of the telescoping relation.

20. A bearing assembly, comprising first and second members adapted to be telescopically disposed with respect to one another, said first member having a circumferential groove thereabout which is opposite a cylindrical surface of the second member when said members are telescopically disposed, a ring of bearing material which is circumferentially split so that it may be moved axially of the first member and into the groove thereabout, said bearing ring having a recess in its side adjacent at least one annular bearing surface which protrudes from the groove for sliding engagement with respect to the cylindrical surface of the second member, and another ring which may be moved axially of the first member and into a position opposite the recess in the bearing ring, said other ring being of a material which is radially distortible into the recess, but relatively non-elastic so that, when so distorted, it will retain said bearing ring within said groove.

21. An assembly of the character defined in claim 20, wherein the recess is intermediate protruding annular bearing surfaces on the side of the bearing ring.

22. An assembly of the character defined in claim 20, wherein the groove in the first member is on the outer side thereof for disposal telescopically within the cylindrical surface on the inner side of the second member, said bearing ring is movable axially over the end of the first member, and the retainer ring is movable axially over the end of the first member and then distorted radially inwardly against the recess in the ring.

23. Apparatus comprising a first member adapted to be telescopically disposed with respect to a second member and having a circumferential groove thereabout which is opposite a cylindrical surface of the second member, when said members are telescopically disposed, a first ring adapted to be assembled within the groove and having a recess in its side adjacent at least one annular surface thereof which protrudes from the groove for sliding engagement with respect to the cylindrical surface of the second member, and a second ring having a circumferential shape which permits it to be moved axially of the first member and into a position opposite the recess in the first ring, said second ring being of a material which is radially distortible into the recess, but relatively non-elastic so that, when so distorted, it will retain said first ring within said groove.

24. Apparatus of the character defined in claim 23, wherein the recess is intermediate protruding annular surfaces on the side of the first ring.

25. Apparatus of the character defined in claim 23, wherein the groove is in the outer side of the first member for disposal telescopically within the cylindrical surface on the inner side of the second member, and said retainer ring is movable axially over the end of the first member and then distorted radially inwardly against the recess in the first ring.

26. In a sealed joint, a first member adapted to be telescopically disposed with respect to a second member and having a circumferential groove thereabout which is opposite a cylindrical surface of the second member, when said members are telescopically disposed, a circumferentially continuous seal ring of elastic material adapted to be distorted into a shape which permits it to be moved axially of the first member and into the groove therein, said seal ring having a recess in its side adjacent at least one annular lip thereof which protrudes from the groove of the first member for sealing engagement with the cylindrical surface of the second member, and another ring having a circumferential shape which permits it to be moved axially of the first member and into a position opposite the recess in the seal ring, said other ring being of a material which is radially distortible into the recess, but relatively nonelastic so that, when so distorted, it will retain said seal ring on said first member.

27. A sealed joint of the character defined in claim 26, wherein the recess is intermediate protruding annular lips on the side of the seal ring.

28. A joint of the character defined in claim 26, wherein the groove is in the outer side of the first member for disposal telescopically within the cylindrical surface on the inner side of the second member, the seal ring is adapted to be stretched over the end of said first member, and the retainer ring is movable axially over the end of the first member and then distorted radially inwardly against the recess in the seal ring.

29. A joint of the character defined in claim 26, wherein the groove is of dovetail shape in cross section, and the seal ring is of matching cross-sectional shape for fitting closely therein.

30. A joint of the character defined in claim 26, including a pair of anti-extrusion rings each of which is circumferentially split to permit it to be disposed between each end of the groove and one end of the seal ring, the ends of the groove being undercut and the ends of the anti-extrusion rings being urged by the seal ring into closely fitting relation within the undercut ends, and the anti-extrusion rings being of a material which is substantially non-elastic but nevertheless sufficiently deformable that their outer surfaces are expanded into positions close to the cylindrical surface of said second member in response to axial expansion of the seal ring.

31. A joint of the character defined in claim 30, wherein the opposite ends of the anti-extrusion rings are undercut and the adjacent ends of the seal ring fit closely thereagainst.

32. A joint of the character defined in claim 27, wherein the outer surfaces of the lips taper convergently toward one another.

33. A joint of the character defined in claim 27, wherein the retainer ring has axially spaced, annular ribs thereabout for pressing tightly against the recess in the seal ring adjacent its corners.

34. A joint of the character defined in claim 27, wherein the seal ring has a hole therein connecting its inner side adjacent the recess with a space on the inner side of the retainer ring intermediate the ribs, and the retainer ring has a hole therein connecting the space with the outer side of the retainer ring.

35. For use in a sealed joint, of the type in which a first member is adapted to be telescopically disposed with respect to a second member, seal means of elastic material is carried by the first member for disposal opposite a cylindrical surface of the second member, when said members are telescopically disposed, and the seal means includes annular sealing portions which protrude from the groove for sealing engagement with the cylindrical surface of the second member, said second member having a guide surface at one end of its cylindrical surface, whereby the protruding sealing portions are successively compressed or decompressed as said members are moved relatively into telescoping relation, and vent means formed therein for substantially equalizing pressure across each sealing portion prior to compression as the members are moved into telescoping relation and decompression as the members are moved out of telescoping relation.

36. A second member of a sealed joint of the character defined in claim 35, wherein the vent means comprises a groove formed in the cylindrical surface of the second member to connect the guide surfaces with the cylindrical surface a distance from the intersection of the guide surface and cylindrical surface at least as great as the compressed width of each protruding sealing portion.

37. A sealed joint of the character defined in claim 35, wherein a second guide surface is formed at the opposite end of the cylindrical surface of the second member, and second vent means is provided in the second member for substantially equalizing pressure across each sealing portion prior to compression by the second guide surface as the members are moved into and decompression with respect thereto as the members are moved out of the telescoping relation.

38. In a bearing assembly, a first member is adapted to be telescopically disposed with respect to a second member, said first member having a circumferential groove thereabout which is opposite a cylindrical surface of the second member when said members are telescopically disposed, a ring of bearing material which is circumferentially split so that it may be moved axially of the first member and into the groove thereabout, said bearing ring having a recess in its side adjacent at least one annular bearing surface which protrudes from the groove for sliding engagement with respect to the cylindrical surface of the second member, and another ring which is of a circumferential shape which permits it to be moved axially of the first member and into a position opposite the recess in the bearing ring, said other ring being of a material which is radially distortible into the recess, but relatively non-elastic so that, when so distorted, it will retain said bearing ring within said groove.

39. An assembly of the character defined in claim 38, wherein the recess is intermediate protruding annular bearing surfaces on the side of the bearing ring.

40. An assembly of the character defined in claim 38, wherein the groove in the first member is on the outer side thereof for disposal telescopically within the cylindrical surface on the inner side of the second member, said bearing ring is movable axially over the end of the first member, and the retainer ring is movable axially over the end of the first member and then distorted radially inwardly against the recess in the ring.

41. For use in sealing between first and second members having cylindrical surfaces adapted to be telescopically disposed with respect to one another, and wherein the inner member has an annular groove formed in its outer cylindrical surface for disposal opposite the inner cylindrical surface of the outer member, a relatively thin seal ring of rubber or other elastic sealing material having an inner side and opposite end surfaces adapted to be closely received within the groove, lips on each end which, when the ring is so received, protrude radially outwardly from the groove so as to be compressed into tight sealing engagement with the cylindrical surface of said outer member, and an annular recess in its outer side intermediate the lips which is adapted to receive a clamping ring.

42. A seal ring of the character defined in claim 41 having a hole therethrough for connecting its outer side with the groove.

43. For use in sealing between first and second members having cylindrical surfaces adapted to be telescopically disposed with respect to one another, and wherein the inner member has an annular, dove-tail shaped grove formed in its outer cylindrical surface for disposal opposite the inner cylindrical surface of the outer member, a realtively thin seal ring of rubber or other elastic sealing material having an inner side and opposite end surfaces which taper divergently outwardly in a direction toward said inner side for disposal closely within the groove, lips on each end which, when the ring is so disposed, protrude radially outwardly from the groove so as to be compressed into tight sealing engagement with the cylindrical surface of said outer member, and an annular recess in its outer side intermediate the lips which is adapted to receive a clamping ring, 44. A seal ring of the character defined in claim 43 having a hole therethrough for connecting its outer side with the groove.

45. For use in sealing between first and second members having cylindrical surfaces adapted to be telescopically disposed with respect to one another, and wherein the inner member has an annular groove formed in its outer cylindrical surface for disposal opposite the inner cylindrical surface of the outer member and having undercut ends, a seal assembly comprising a relatively thin seal ring of rubber or other elastic sealing material having an inner side for disposal closely within the groove, lips on each which, when the ring is so disposed, protrude radially outwardly from the groove so as to be compressed into tight sealing engagement with the cylindrical surface of said outer member, and an annular recess in its outer side intermediate the lips which is adapted to receive a clamping ring, and a pair of anti-extrusion rings each of which is circumferentially split to permit it to be disposed between an end of the seal ring and an undercut end of the groove, the adjacent ends of the seal ring and anti-extrusion rings being tapered divergently outwardly in a direction toward the inner side of the seal ring whereby the seal ring will be retained by the anti-extrusion ring and the ends of the anti-extrusion rings will be urged by the seal ring into close fitting relation with the undercut ends of the groove.

46. A seal assembly the the character defined in claim 45, wherein the seal ring has a hole therethrough for connecting its outer side with the groove.

47. An assembly for sealing between first and second members having cylindrical surfaces adapted to be telescopically disposed with respect to one another, and wherein the inner member has an annular groove formed in its outer cylindrical surface for disposal opposite the inner cylindrical surface of the outer member, said assembly comprising a relatively thin seal ring of rubber or other elastic sealing material having an inner side and opposite end surfaces adapted to be closely received within the groove, lip on each end which, when the ring is so received, protrude radially outwardly from the groove so as to be compressed into tight sealing engagement with the cylindrical surface of said other outer, an annular recess in its outer side intermediate the lips, and a clamping ring having a circumferential shape which permits it to be moved axially of the first member and into a position opposite the recess in the ring, when the seal ring is received with the groove, said clamping ring being of a material which is radially distortible into the recess, but relatively nonelastic so that, when so distorted, it will retain said seal ring on said first member.

48. A seal assembly of the character defined in claim 47, wherein the seal ring has a hole therethrough for connecting its outer side with the groove.

49. An assembly sealing between first and second members having cylindrical surfaces adapted to be telescopically disposed with respect to one another, and wherein the inner member has an annular, dove-tail shaped groove formed in its outer cylindrical surface for disposal opposite the inner cylindrical surface of the other member, said assembly including a relatively thin seal ring of rubber to other elastic sealing material having an inner side and opposite end surfaces which taper divergently outwardly in a direction toward said inner side for disposal closely within the groove, lips on each end which, when the ring is so disposed, protrude radially outwardly from the groove so as to be compressed into tight sealing engagement with the cylindrical surface of said outer member, an annular recess in its outer side intermediate the lips, and clamping ring having a circumferential shape which permits it to be moved axially of the first member and into a position opposite the recess in the ring, when the seal ring is received with the groove, said clamping ring being of a material which is radially distortible into the recess, but relatively nonelastic so that, when so distorted, it will retain said seal ring on said first member.

50. A seal assembly of the character defined in claim 49, wherein the sealing ring has a hole therethrough for connecting its outer side with the groove.

51. An assembly for sealing between first and second members having cylindrical surfaces adapted to be telescopically disposed with respect to one another, and wherein the inner member has an annular groove formed in its outer cylindrical surface for disposal opposite the inner cylindrical surface of the outer member and having undercut ends, said seal assembly comprising a relatively thin seal ring of rubber or other elastic sealing material having an inner side for disposal closely within the groove, lips on each end which, when the ring is so disposed, protrude radially outwardly from the groove so as to be compressed into tight sealing engagement with the cylindrical surface of said outer member, and an annular recess in its outer side intermediate the lips, a pair of anti-extrusion rings each of which is circumferentially split to permit it to be disposed between an end of the seal ring and an undercut end of the groove, the adjacent ends of the seal ring and anti-extrusion rings being tapered divergently outwardly in a direction toward the inner side of the seal ring whereby the seal ring will be retained by the anti-extrusion ring and the ends of the anti-extrusion rings will be urged by the seal ring into close fitting relation with the undercut ends of the groove, and a clamping ring having a circumferential shape which permits it to be moved axially of the first member and into a position opposite the recess in the ring, when the seal ring is received with the groove, said clamping ring being being of a material which is radially distortible into the recess, but relatively nonelastic so that, when so distorted, it will retain said seal ring on said first member.

52. A seal assembly of the character defined in claim 51, wherein the seal ring has a hole therethrough for connecting its outer side with the groove.

* * * * *